(12) United States Patent
Nguyen Kim et al.

(10) Patent No.: US 9,417,087 B1
(45) Date of Patent: Aug. 16, 2016

(54) INTERACTIVE 3D NAVIGATION SYSTEM

(71) Applicants: VOLKSWAGEN AG, Wolfsburg (DE); AUDI AG, Ingolstadt (DE)

(72) Inventors: Julia Nguyen Kim, Redwood City, CA (US); Gerardo Alberto Rossano, Foster City, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/616,133

(22) Filed: Feb. 6, 2015

(51) Int. Cl.
G01C 21/00 (2006.01)
G01C 21/36 (2006.01)

(52) U.S. Cl.
CPC .................... *G01C 21/367* (2013.01)

(58) Field of Classification Search
None
See application file for complete search history.

(56) References Cited

U.S. PATENT DOCUMENTS

| | | | |
|---|---|---|---|
| 8,359,157 B2 | 1/2013 | Figueroa | |
| 2006/0284879 A1 | 12/2006 | Nagata et al. | |
| 2010/0250120 A1 | 9/2010 | Waupotitsch et al. | |
| 2013/0325341 A1 | 12/2013 | van Os et al. | |
| 2013/0345980 A1* | 12/2013 | van Os | G01C 21/3626 701/538 |
| 2014/0188388 A1* | 7/2014 | Malahy | G01C 21/367 701/533 |
| 2014/0365126 A1* | 12/2014 | Vulcano | G01C 21/36 701/533 |
| 2014/0365965 A1* | 12/2014 | Bray | G06T 11/001 715/810 |

FOREIGN PATENT DOCUMENTS

| | | |
|---|---|---|
| EP | 2541201 A2 | 1/2013 |
| JP | 2007163234 A | 6/2007 |
| WO | 2011154050 A1 | 12/2011 |

OTHER PUBLICATIONS

Written Opinion of the International Searching Authority and International Search Report for International Patent Application No. PCT/EP2016/052569; dated Apr. 25, 2016.

* cited by examiner

*Primary Examiner* — Adam Alharbi
(74) *Attorney, Agent, or Firm* — Barnes & Thornburg LLP

(57) ABSTRACT

An interactive vehicle navigation system for previewing turns for a user using animations that show realistic, three-dimensional views of the locale of turns. The previews show a user how the locale of the turns will appear as the instructions are followed. A vantage of the preview is adjusted to promote clear views of the locale. User controls enable a driver to view previews at times that are safe and convenient for the driver and are located in positions that promote driver convenience and safety.

22 Claims, 7 Drawing Sheets

INTERACTIVE 3D NAVIGATION SYSTEM

BACKGROUND

The present disclosure relates to systems, components, and methodologies for vehicle navigation systems. In particular, the present disclosure relates to systems, components, and methodologies that provide a user with navigational instructions.

SUMMARY

According to the present disclosure, systems, components, and methodologies are provided for providing navigational instructions to a user.

In illustrative embodiments, a vehicle navigation system provides route guidance to a user that includes instructions the user should follow at turns along a route. The navigation system previews upcoming turns for the user by providing a three-dimensional ("3D"), animated rendering of how the locale of the turns will appear as the instructions for the turns are followed. The 3D animated preview provides a realistic view of the locale, including three-dimensional imagery of recognizable landmarks in the locale. The point of view from which the 3D animated preview is generated is selected as to provide a vantage of the locale that avoids obstructions to the user's view, such as from a point of view that is higher than street level. The realistic, 3D animated previews make it easier for a user to understand the nature of the instructions being conveyed by the vehicle navigation system.

In other illustrative embodiments, the navigation system includes user controls that enable a user to trigger display of the 3D animated previews, such steering wheel buttons, voice control functionality, or other forms of user controls. The user controls enable a user to view the 3D animated previews at desired times, such as when it is convenient or safe to view the 3D animated previews. This prevents the user from being interrupted with navigational instructions when the user is not ready for them, such as when the user is focused on driving. The user controls enable a user to iterate through 3D animated previews of all of the turns along a route in sequence, or to select a specific turn to preview. The navigation system may block display of 3D animated previews when the vehicle is moving due to safety considerations, and allow display of the 3D animated previews of turns when the vehicle is stopped.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
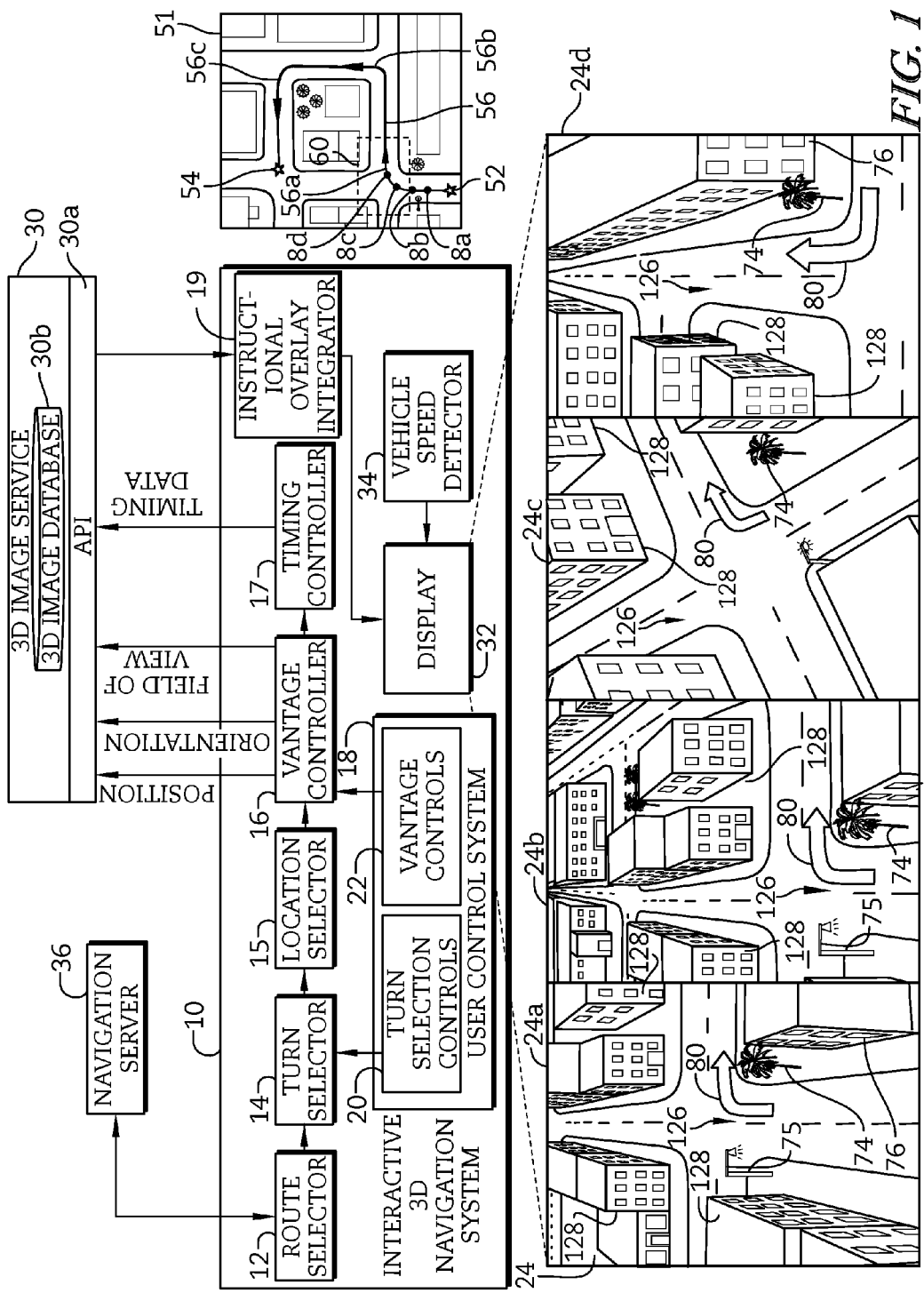
FIG. 1 is a diagrammatic view of an interactive 3D navigation system in accordance with the present disclosure showing that the interactive 3D navigation system communicates with a navigation server to receive route guidance, and includes a route selector for selecting a route between an origin and a destination, a turn selector for selecting a turn to preview, a location selector for selecting locations along the turn to be part of the preview, a vantage controller for computing a vantage for the preview of the selected turn, a timing controller for computing timing information that governs the animation speed of the preview, an instructional overlay integrator for retrieving a 3D animated preview and overlaying instructions on the animated preview, a display for rendering the 3D animated preview, a user control system that enables a user to interact with the interactive 3D navigation system, a vehicle speed detector for determining and communicating vehicle speeds to the interactive 3D navigation system, and a 3D image service from which the interactive 3D navigation system may retrieve 3D image data.
Figure 2:
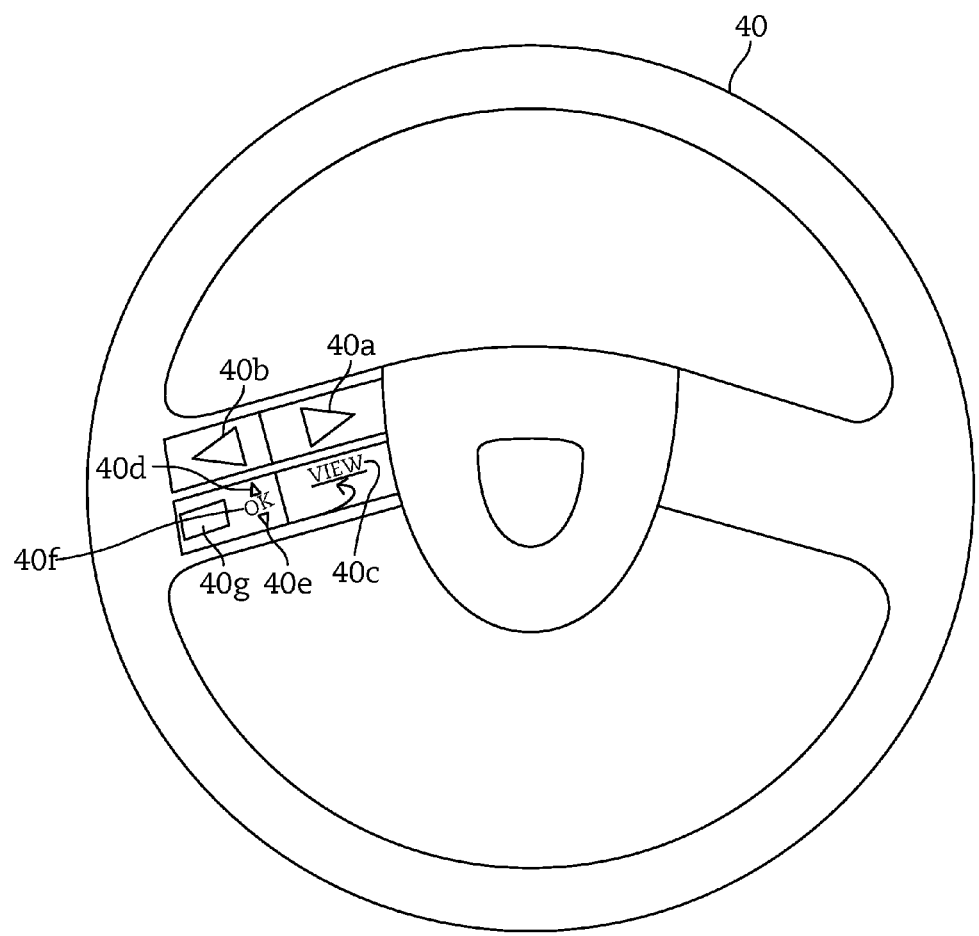
FIG. 2 is a front perspective view of a steering wheel with user control buttons in accordance with the present disclosure that enable a user to select turns or select vantages for turns that are previewed through 3D animated previews.

FIGS. 1-6 illustrate systems, components, and methodologies for an interactive 3D navigation system 10 that provides route guidance instructions to a user and previews upcoming turns for the user through 3D, animated renderings of how the locale of the turns will appear as the instructions for the turns are followed. FIG. 1 is a diagrammatic view of interactive 3D navigation system 10. Interactive 3D navigation system 10 includes certain components for selecting the turn to be previewed, including a route selector 12 that enables a user to select a route to follow from an origin to a destination and a turn selector 14 that enables a user to select a turn along the selected route that the user wishes to preview. Interactive 3D navigation system 10 also includes means for selecting locations, such as a location selector 15 that selects locations 8a-8d along the turn that will be part of the preview, and means for selecting vantages, such as a vantage controller 16, that selects a vantage for each of the locations that promotes clear viewing of the locale of the turn. A user may select a desired turn to preview and may adjust the vantage through user control system 18.

Once a route, turn, and vantage have been selected, interactive 3D navigation system 10 receives a 3D animated preview 24 of the selected turn. 3D animated preview 24 may be retrieved from a cloud-based, 3D image service 30 using a network connection. Instructional overlay integrator 19 adds instructional overlays, such as instructional arrow 80, to 3D animated preview 24. A display 32 may then render 3D animated preview 24. FIG. 1 illustrates 3D animated preview 24 by way of four exemplary image frames 24a-d that are part of 3D animated preview 24, but it should be understood that 3D animated preview 24 may be rendered with a sufficient number of frames and frame rate as to simulate continuous, live motion. 3D animated preview 24 simulates how the locale of the selected turn will appear as instructions for the selected turn are followed.

Prior to displaying 3D animated preview 24, display 32 may communicate with vehicle speed detector 34 to determine whether the user's vehicle is stopped or in motion. If the vehicle is in motion, interactive 3D navigation system 10 may determine it is unsafe to display 3D animated preview 24, and display 32 may instead show a still image of the selected turn, such as a frame 24a in isolation.

Interactive 3D navigation system 10 provides a technical solution to the technical challenges faced as part of the problem of providing clear, recognizable, understandable and easy-to-follow route guidance to a user. Interactive 3D navigation system 10 displays 3D animated previews of turns with realistic depictions of locales surrounding the turns, and selects vantages that avoid obstructions to the user's view. This enables a user to easily recognize and follow navigation instructions. In addition, interactive 3D navigation system 10 also provides a technical solution to the technical challenges faced as part of the technical problem of ensuring driver safety while enabling convenience when following route guidance. Interactive 3D navigation system 10 shows still images, rather than animated previews, while the vehicle is in motion, and enables the driver to select and invoke animated previews at safe and convenient times through use of user controls, including conveniently located buttons on a vehicle steering wheel.

In more detail with reference to FIG. 1, route selector 12 may enable a user to choose an origin 52 and a destination 54 for which the user seeks route guidance. Route selector 12 may communicate origin 52 and destination 54 to navigation server 36, which computes a suitable route between origin 52 and destination 54, as is generally known for conventional navigation systems. Navigation server 36 may communicate the suitable routes to the user via display 32. Map view 51 depicts an illustrative route 56 for which interactive 3D navigation system 10 may generate previews, as will be explained below.

Route 56 may include a plurality of turns 56a-c and instructions that the user should follow at each of the turns 56a-c. For example, route 56 includes instructions that the user should turn right at turn 56a. Turn selector 14 selects one of turns 56a-c to preview for the user. Turn selector 14 may select one of turns 56a-c automatically or based on user input. When selecting one of turns 56a-c automatically, turn selector 14 may begin with the first turn 56a of route 56 and iterate through each of the turns 56a-c in chronological sequence. Alternatively, turn selector 14 may track the location of the user's vehicle (e.g., using a GPS module (not shown)) and determine which of the turns 56a-c the user will next encounter.

As noted, turn selector 14 may also select one of turns 56a-c through user input. User control system 18 may include turn selection controls 20 that enable a user to select one of turns 56a-c to preview. Turn selection controls 20 may include steering wheel buttons 40a-c located on a steering wheel 40, shown in FIG. 2. Use of steering wheel buttons 40a-c may promote vehicle safety and driver convenience because steering wheel buttons 40a-c enable a driver to make turn selections without having to move his or her hands from steering wheel 40. A driver may determine when he or she would like to view a 3D animated preview of a turn of interest, and use steering wheel buttons 40a-c to select and preview the turn of interest. Steering wheel button 40a may enable a user to iterate to a next one of turns 56a-c along route 56, steering wheel button 40b may enable a user to iterate to a previous one of turns 56a-c along route 56, and steering wheel button 40c may allow a user to finalize a selection of a particular one of turns 56a-c for previewing.

Other types of turn selection controls 20 are within the scope of the present disclosure. For example, turn selection controls 20 may include voice recognition, such that interactive 3D navigation system 10 is responsive to voice commands from a user. By way of example, voice commands may instruct interactive 3D navigation system 10 to iterate to a next or a previous turn, to jump to a particular turn of interest, or to display a 3D animated preview of a selected turn. Other types of turn selection controls 20 may include touch-sensitive/haptic controls on steering wheel 40 or on display 32.

Returning to FIG. 1, in response to turn selector 14 selecting a turn 56a-c, location selector 15 selects locations along turn 56a-c that a vehicle is likely to traverse, and which should be included in 3D animated preview 24. In this example, location selector 15 selects four locations 8a-8d along turn 56a. In illustrative embodiments, location selector 15 selects fewer locations for ordinary turns, such as conventional right-hand or left-hand turns, and more locations for more complex maneuvers. By selecting more locations for complex maneuvers, 3D animated preview 24 is more likely to align with the actual path the vehicle takes as it traverses turns 56a-c.

In this illustrative example, location selector 15 selects a location 8a where a vehicle begins a maneuver, one or more locations 8b-8c that a vehicle may occupy while performing the maneuver, and a location 8d where a vehicle completes the maneuver. Locations 8a-8d guide 3D image service 30 in providing an appropriate animation, as will be explained below.

For each location selected by location selector 15, vantage controller 16 may select a vantage to be used for 3D animated preview 24. Vantage controller selects a point of view for 3D animated preview 24 that promotes clear viewing of locale 60 for selected turn 56a. A vantage may include a position, an orientation, and a field of view. A position may include latitude, longitude, and elevation of a point of view. An orientation may include an angular orientation (e.g., pitch, roll, and yaw) of a point of view. A field of view may specify lateral and vertical angular ranges for a field of vision to be displayed. As with turn selector 14, vantage controller 16 may operate automatically or manually based on user input.

Figure 3:
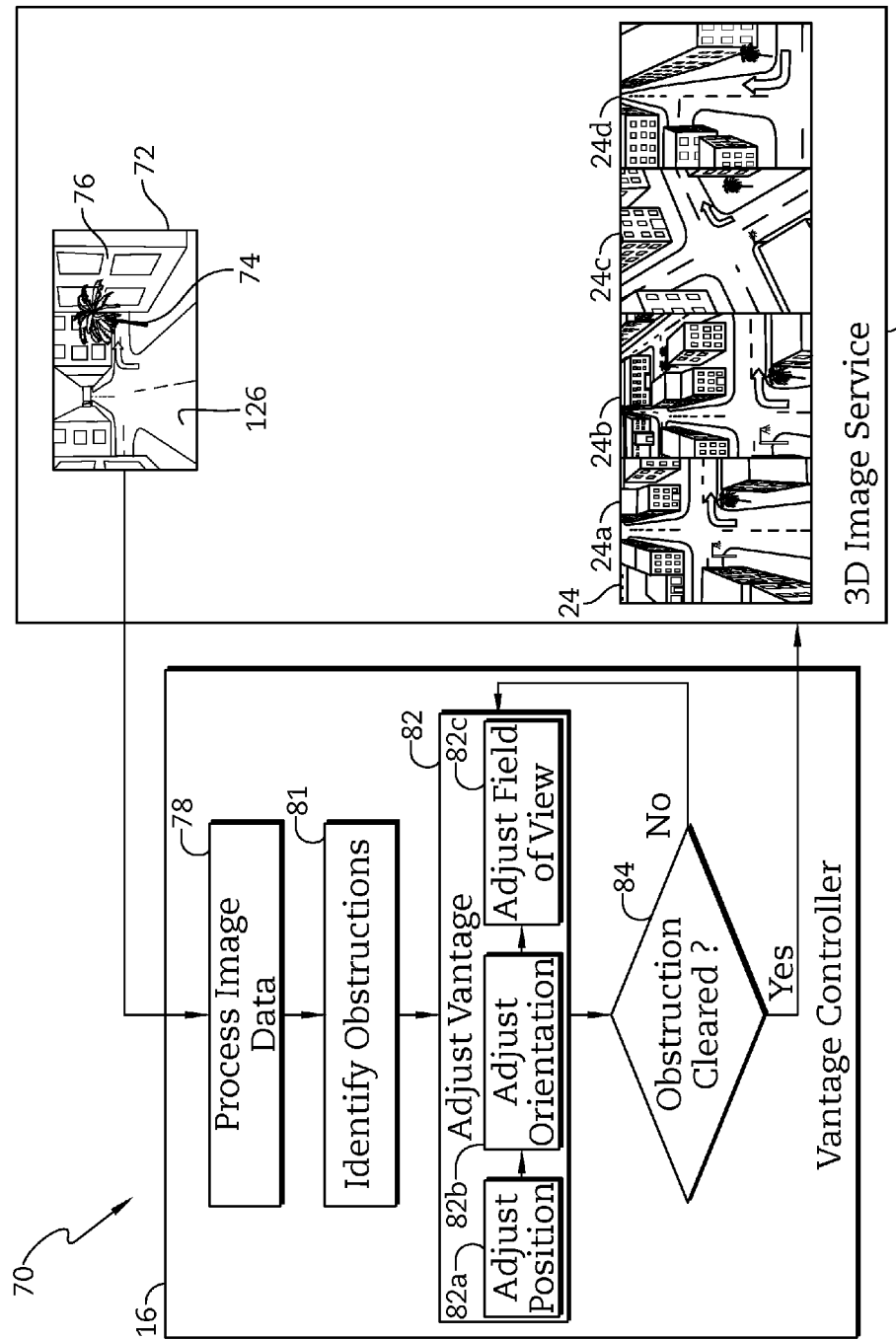
FIG. 3 is a diagrammatic view of a vantage selection process of the interactive 3D navigation system in accordance with the present disclosure showing that the vantage selection process includes the operations of processing image data, identifying obstructions, adjusting a vantage, including a position, orientation, and field of view, and determining if the obstruction is cleared.

FIG. 3 illustrates an automatic vantage selection process 70 in accordance with the present disclosure. Vantage controller 16 may receive one or more frames 72 of 3D image data of locale 60 of turn 56a. As shown in FIG. 3, the vantage of frame 72 prevents clear viewing of locale 60 of turn 56a due to obstructions, including a tree 74 and a building 76. Vantage selection process 70 may include a processing operation 78 that performs image processing on frame 72, such as to adjust and enhance image properties (e.g., brightness, contrast, edge enhancement, noise suppression, etc.). Vantage selection process 70 may proceed to an identifying operation 81 that identifies obstructions within frame 72. Identifying operation 81 may implement any suitable object detection, recognition, and classification methodology to identify a roadway 126 and obstructions, such as tree 74 and building 76, that obscure roadway 126.

Vantage selection process 70 may then proceed to an adjusting operation 82 that adjusts the vantage as to avoid obstructions 74, 76. Adjusting operation 82 may include an adjusting operation 82a that adjusts a position, an adjusting operation 82b that adjusts an orientation, and adjusting operation 82c that adjusts a field of view. Vantage selection process 70 may then proceed to a determining operation 84 that determines whether obstructions 74, 76 have been cleared from the view of roadway 126. If not, vantage selection process 70 returns to adjusting operation 82, and iteratively adjusts the vantage until obstructions 74, 76 have been cleared. In response to a determination that obstructions have been cleared, vantage selection process 70 concludes.

Frames 24a-d illustrate an exemplary result of vantage selection process 70. In this example, the position was adjusted to increase elevation, the orientation was adjusted to point downwards towards roadway 126, and the field of view was increased to provide a larger area for viewing. This provides a point of view that avoids obstructions 74, 76. In other examples, it may be advantageous to change position, orientation, or field of view in other respects. For example, if there is an overhead bridge on a roadway, it may be advantageous to lower the position such that a user can see below the bridge.

In addition or alternatively, vantage controller 16 may enable a user to manually adjust the vantage based on user input. User control system 18 may include vantage controls 22, such as steering wheel buttons 40a-g, shown in FIG. 2. For example, steering wheel buttons 40a-40b may be used to adjust a latitude of a position and steering wheel buttons 40d-40e may be used to adjust a longitude of a position. Steering wheel buttons 40d-40e may also be used to adjust an elevation of a position higher or lower. Steering wheel buttons 40a-40b may be used to adjust a yaw of an orientation, steering wheel buttons 40d-40e may be used to adjust a pitch of an orientation, and other steering wheel buttons (not shown) may be used to adjust a roll of an orientation. Steering wheel buttons 40a-40b may be used to increase a horizontal angular view, and steering wheel buttons 40d-e may be used to increase a vertical angular view. Steering wheel button 40f may be used to finalize selections. Spin wheel 40g is an alternative form of vantage angle controls 22 and may be spun to modify the vantages. As with turn selection controls 20, vantage controls 22 may be implemented through other forms of user input, including voice control or touch/haptic control.

Returning to FIG. 1, in addition to vantage controller 16 computing vantages, interactive 3D navigation system 10 includes means for computing timing information, such as timing controller 17 that computes timing data to guide 3D image service 30 in creation of animations. So that 3D animated preview 24 can be rendered at a realistic speed representative of how long it would take a vehicle to navigate turn 56a, timing controller 17 computes timing data used to determine the relative speed of different portions of 3D animated preview 24. For locations 8a-8d that are spaced closely together, 3D animated preview 24 may proceed rapidly through image frames 24a-24d, simulating the relatively short period of time it would take a vehicle to traverse closely-spaced locations. For locations 8a-8d that are spaced far apart, 3D animated preview 24 may proceed slowly through image frames 24a-24d, simulating the relatively long period of time it would take a vehicle to traverse farther-spaced locations. Timing controller 17 computes an amount of time it would take a vehicle to navigate through locations 8a-8d based on distances between locations 8a-d.

Interactive 3D navigation system 10 may then query 3D image service 30 for 3D animated preview 24. The query may include position, orientation, and field of view information computed by vantage controller 16, and timing data computed by timing controller 17. Interactive 3D navigation system 10 may query 3D image service 30 through an API 30a, which in turn may query and retrieve appropriate frames of image data from 3D image database 30b. Image data stored in 3D image database 30b may include, for example, photographic images, satellite images, or other forms of imagery. The query may include criteria for the desired frames of image data, including the geographic location of turn 56a, locations 8a-c selected by location selector 15, and the vantage computed by vantage controller 16. 3D image service 30 may retrieve the appropriate frames of image data and, based on timing data computed by timing controller 17, arrange the frames of image data into a 3D animated preview 24. In an exemplary implementation, 3D image service 30 may be provided by GOOGLE® EARTH®, from Google Inc. of Mountain View, Calif., with API 30a being a GOOGLE® EARTH® API.

Interactive 3D navigation system 10 retrieves 3D animated preview 24 from 3D image service 30. Instructional overlay integrator 19 integrates instructional overlays, such as instructional arrow 80, onto 3D animated preview 24. Instructional overlays may also include instructional text or other types of instructional symbols, such as lines or shapes directing a driver's attention to certain portions of 3D animated preview 24. 3D animated preview 24 includes 3D, realistic imagery of locale 60 of turn 56a, including buildings 76, 128, trees 74, lightposts 75, and other landmarks that may assist a user in recognizing locale 60 when the user actually arrives at locale 60. Use of 3D animated preview 24 in conjunction with instructional arrow 80 makes it easier for a user to recognize locale 60 and understand what instructions the user should follow at locale 60 in comparison to flat map depictions or other, more simplified map representations (e.g., wireframes).

Display 32 may communicate with vehicle speed detector 34, which may obtain and communicate vehicle speed information to display 32 for safety or convenience considerations. Where a vehicle is in motion, it may be unsafe or distracting to display 3D animated preview 24 because the vehicle driver may be focused on driving and may not want to be interrupted by 3D animated preview 24. In such situations, it may be preferable to display a still image, such as an isolated frame 24a, of locale 60.

Figure 4:
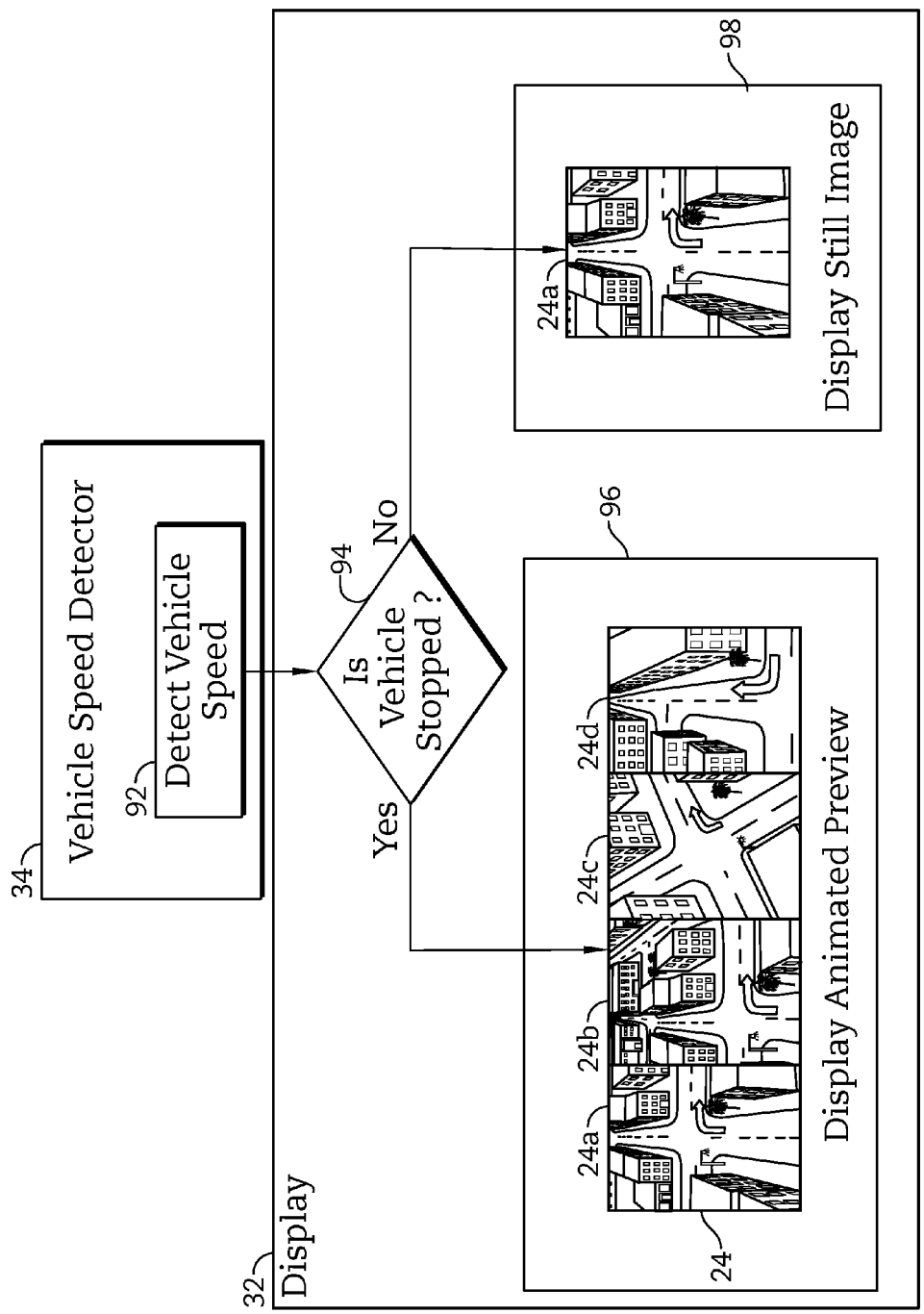
FIG. 4 is a diagrammatic view of a vehicle speed detection process of the interactive 3D navigation system in accordance with the present disclosure showing that the vehicle speed detection process includes the operations of detecting vehicle speed, determining whether the vehicle is stopped, displaying a 3D animated preview in response to a determination that the vehicle is stopped, and displaying a still image in response to a determination that the vehicle is in motion.

FIG. 4 is a diagrammatic view of a vehicle speed detection process 90 by which interactive 3D navigation system 10 determines whether to display 3D animated preview 24 or a still image, such as isolated frame 24a. Vehicle speed detection process 90 begins with detecting operation 92, in which vehicle speed detector 34 determines vehicle speed. Vehicle speed detector 34 may determine vehicle speed through, for example, the vehicle's CAN bus or other form of networked communication with the vehicle's electrical systems. Vehicle speed detector 34 may communicate the vehicle speed to display 32. Vehicle speed detection process 90 may then proceed to determining operation 94, in which display 32 determines whether the vehicle is stopped. If the vehicle is stopped, vehicle speed detection process 90 proceeds to displaying operation 96, in which 3D animated preview 24 is displayed.

If the vehicle is in motion, vehicle speed detection process 90 proceeds to displaying operation 98, in which still frame 24a is displayed. Still frame 24a shows realistic, 3D imagery and instructional arrow 80, but remains as a still image rather than an animation. In illustrative embodiments, still frame 24a previews a location 8a (shown in FIG. 1) where a vehicle will enter a maneuver.

In exemplary embodiments, interactive 3D navigation system 10 shows 3D animated preview 24 only when the vehicle has been stopped for a predetermined amount of time, such as two or three seconds. Still other alternative embodiments may use predetermined speed thresholds, and may display 3D animated preview 24 so long as the vehicle is travelling below a predetermined speed threshold. Still other embodiments may allow a user to override vehicle speed detection process 90 such that display 32 always shows 3D animated preview 24 regardless of vehicle speed, though in some implementations such override mechanisms may not be provided due to safety considerations.

Figure 5A:
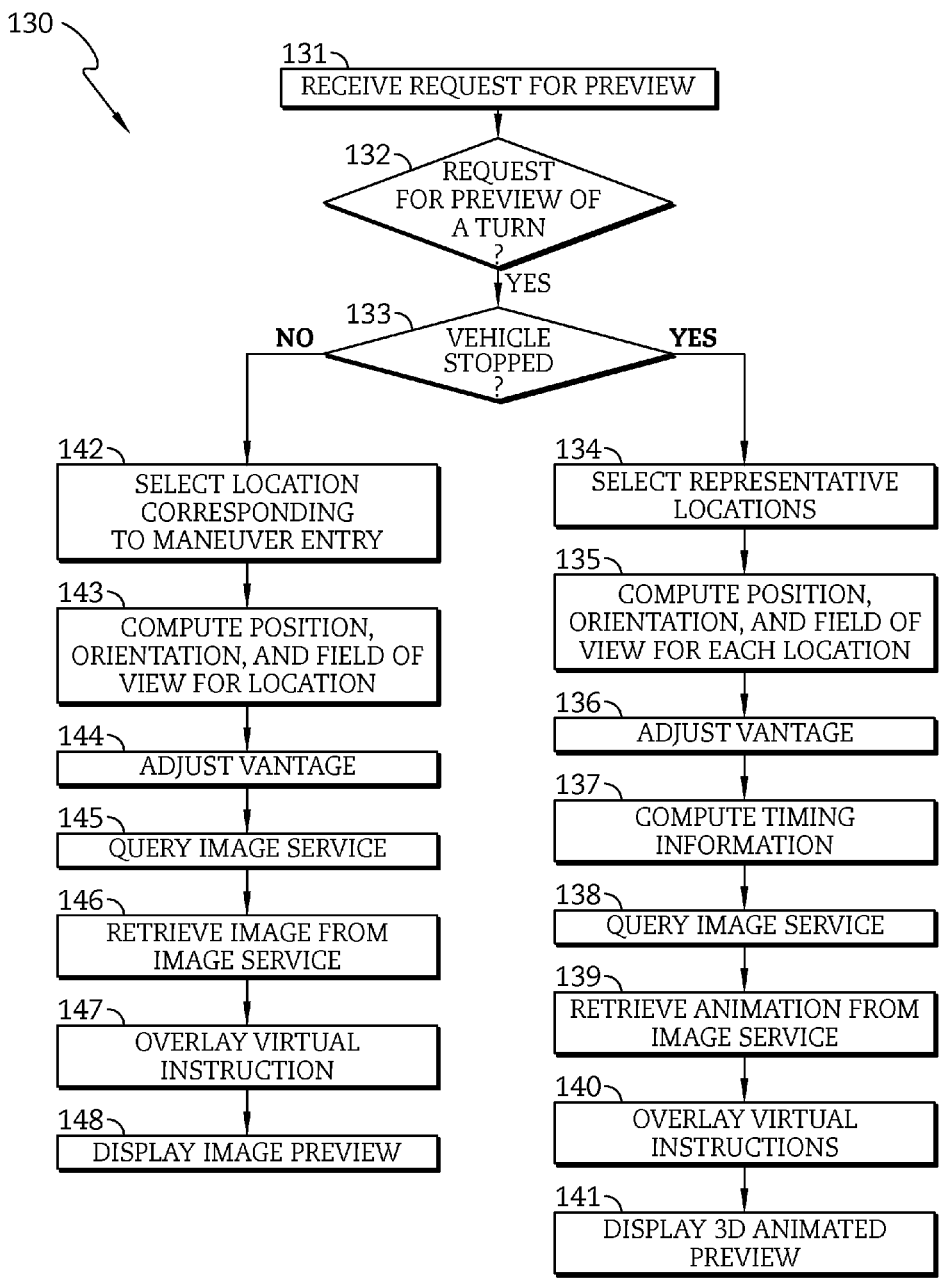
FIG. 5A is a diagrammatic view of a route preview process showing operations of the route preview process when a user requests a preview of a single turn both in the situation where a vehicle is stopped and in the situation where a vehicle is moving.

FIG. 5A is a diagrammatic view of a route preview process 130 performed by an interactive 3D navigation system showing operations where a user requests a preview of a single turn. At 131, interactive 3D navigation system 10 receives a request for a preview. At 132, interactive 3D navigation system 10 determines whether the request is for a preview of a single turn, rather than a full route. If the request is for a preview of a single turn, route preview process 130 proceeds to 133, in which interactive 3D navigation system 10 determines whether the vehicle is stopped.

If the vehicle is stopped, route preview process 130 proceeds to 134, in which interactive 3D navigation system 10 selects representative locations along the turn. At 135, a vantage, including position, orientation, and field of view, is computed for each location. At 136, the vantage is adjusted to improve visibility, and at 137, timing information is computed to guide the speed of animated previews.

Route preview process 130 may then proceed to 138, in which interactive 3D navigation system 10 queries a 3D image service to obtain a 3D animated preview of the turn in accordance with the computed vantage and timing information. At 139, interactive 3D navigation system 10 retrieves a 3D animated preview from the 3D image service. At 140, interactive 3D navigation system 10 overlays virtual instructions, such as instructional arrows, on the 3D animated preview. At 141, the 3D animated preview is displayed.

If determining operation 133 concludes that the vehicle is not stopped, route preview process 130 may display a still image preview rather than an animated preview. Route preview process 130 may proceed to 142, in which interactive 3D navigation system 10 selects a location corresponding to an entry point for maneuvering the turn. At 143, interactive 3D navigation system 10 computes a vantage, including position, orientation, and field of view, for the selected location. At 144, the vantage is adjusted to improve visibility.

At 145, interactive 3D navigation system 10 queries a 3D image service, and at 146, interactive 3D navigation system 10 retrieves an image from 3D image service. At 147, interactive 3D navigation system 10 overlays a virtual instruction, such as an instructional arrow, on the image. Finally, at 148, interactive 3D navigation system 10 displays an image preview.

Figure 5B:
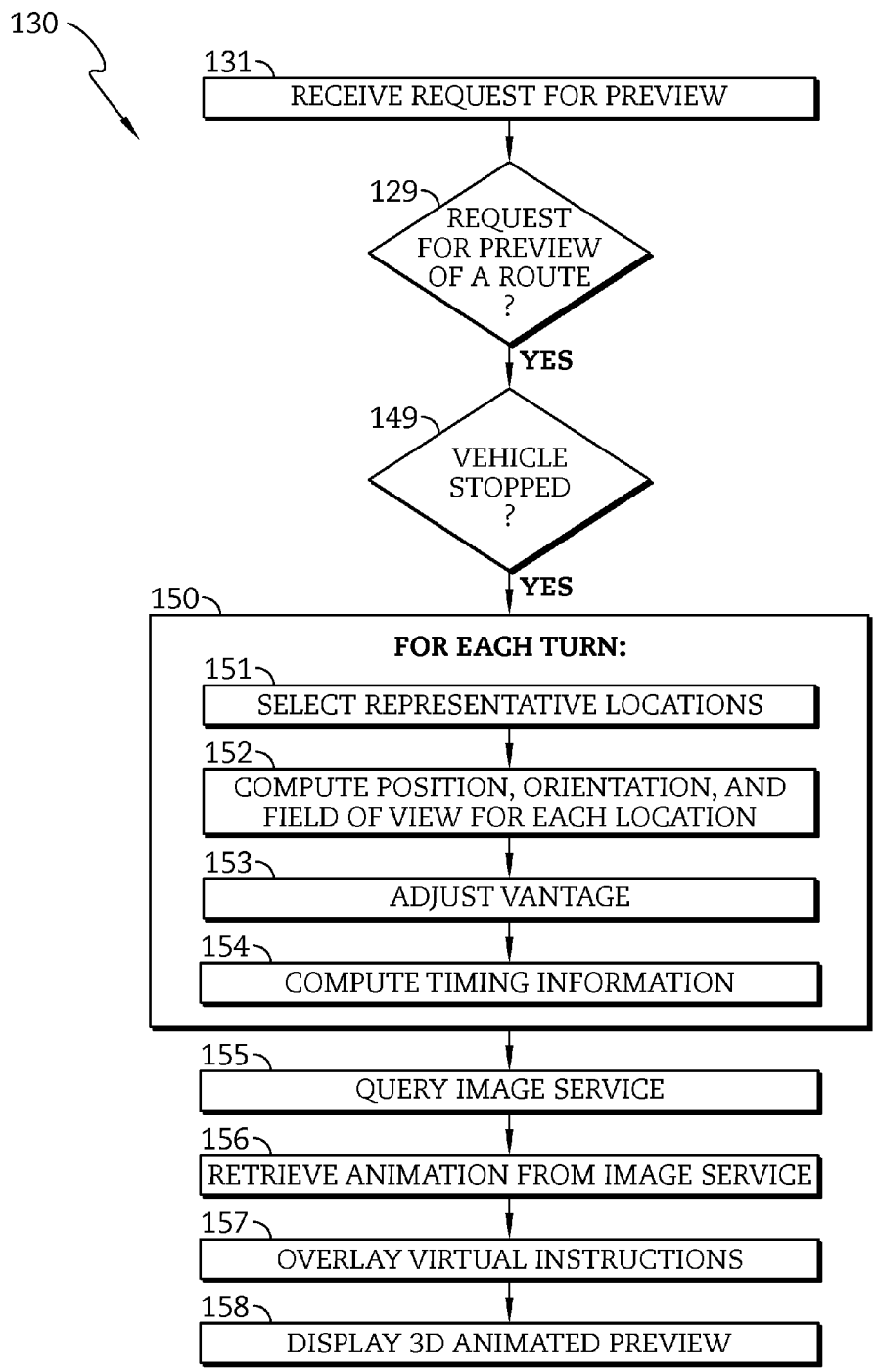
FIG. 5B is a diagrammatic view of a route preview process showing operations of the route preview process when a user requests a preview of a full route in the situation where a vehicle is stopped.

FIG. 5B is a diagrammatic view of route preview process 130 showing operations where a user requests a preview of an entire route. At 131, interactive 3D navigation system 10 receives a request for a preview. At 129, interactive 3D navigation system 10 determines whether the requested preview is for a route rather than a turn. If the requested preview is for a route, at 149, interactive 3D navigation system 10 determines whether the vehicle is stopped.

If the vehicle is stopped, route preview process 130 proceeds to 150, which iterates through operations 151-154 for each turn of the route. At 151, interactive 3D navigation system 10 selects representative locations for each turn. At 152, interactive 3D navigation system 10 computes a vantage, including position, orientation, and field of view, for each location of each turn. At 153, interactive 3D navigation system 10 adjusts the vantage, and at 154, interactive 3D navigation system 10 computes timing information to guide the speed of animated previews.

At 155, interactive 3D navigation system 10 queries a 3D image service, and at 156, interactive 3D navigation system 10 receives a 3D animated preview from the 3D image service. At 157, interactive 3D navigation system 10 overlays virtual instructions, such as an instructional allow, on the 3D animated preview. At displaying operation 158, the 3D animated preview is displayed.

Figure 6:
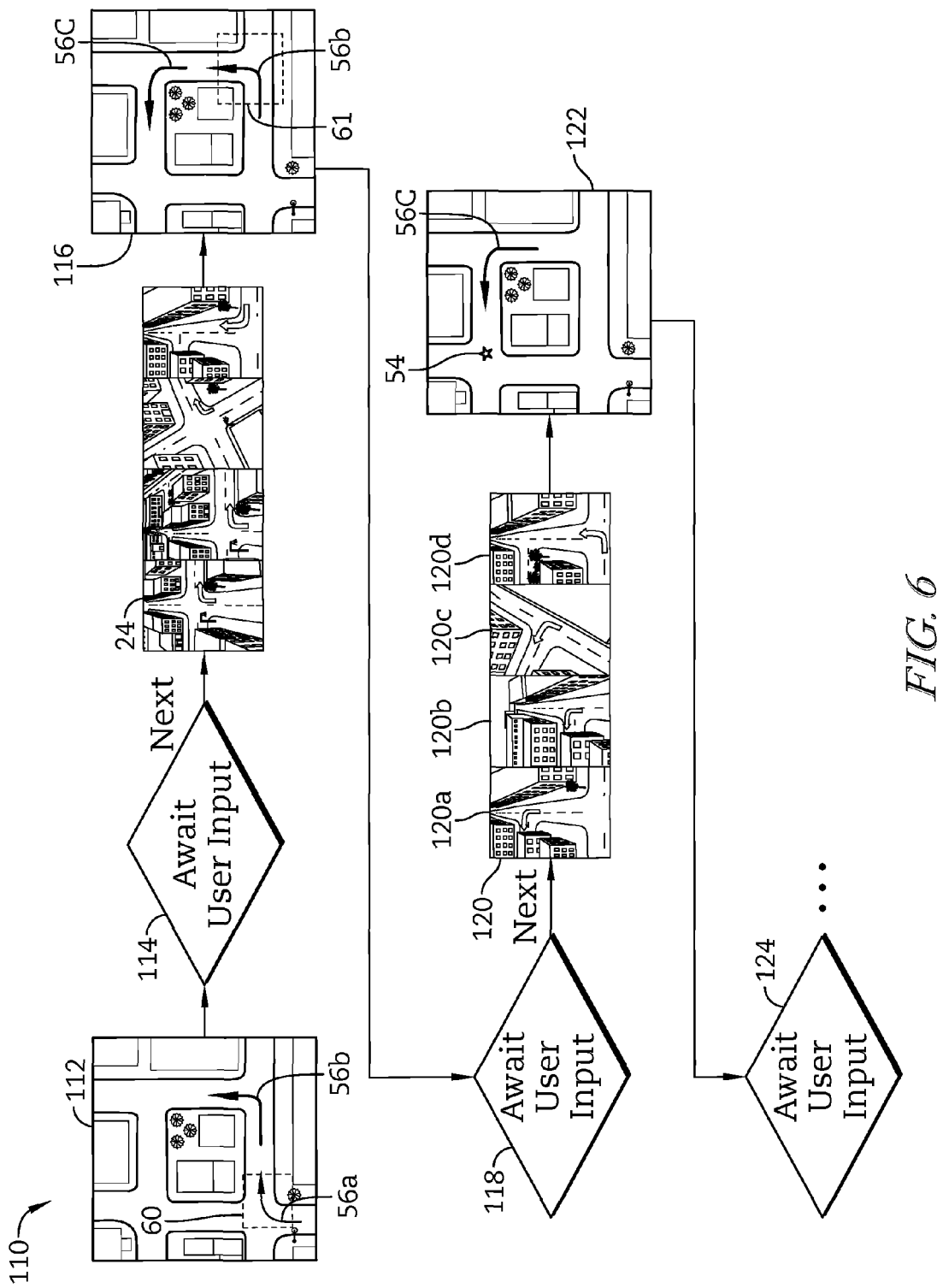
FIG. 6 is a flow diagram illustrating an exemplary usage of the interactive 3D navigation system in accordance with the present disclosure showing that a user may iterate turn-by-turn through 3D animated previews of upcoming turns, the interactive 3D navigation system may zoom into the 3D animated preview for each of the turns, and the interactive 3D navigation system may zoom out after completing the 3D animated preview for each of the turns.

FIG. 6 is a flow diagram 110 illustrating an exemplary usage of interactive 3D navigation system 10, and illustrates that a rendering of an animated preview may zoom in and zoom out of previewed turns to enhance understandability of route guidance. Flow diagram 110 shows an initial display screen 112 that is in a zoomed-out configuration and suitable for rendering on display 32. Display screen 112 highlights the first two turns 56a, 56b along route 56. By highlighting the first two turns 56a, 56b on a common display screen 112, interactive 3D navigation system 10 enables a user to gauge an approximate distance between first turn 56a and second turn 56b.

Interactive 3D navigation system 10 may next await user input 114. In the illustrated usage, the user elects to preview first turn 56a, which may be illustratively accomplished by pressing steering wheel button 40a, shown in FIG. 2. In response to receiving user input, display 32 may zoom in on a 3D rendering of locale 60 of turn 56a, and proceed to display 3D animated preview 24 of turn 56a. In illustrative embodiments, 3D animated preview 24 begins several meters before turn 56a and concludes several meters after turn 56a, and may last several seconds. After displaying final frame 24d of 3D animated preview 24, display 32 may zoom out as to show display screen 116, with second turn 56b and third turn 56c highlighted so that the user can gauge a distance therebetween.

Interactive 3D navigation system 10 may next await user input 118. If the user elects to view the next turn 56b, display 32 may zoom in on a 3D image of a locale 61 of turn 56b and proceed to show a 3D animated preview 120 of turn 56b. After completing 3D animated preview 120, display 32 may zoom out as to show display screen 122, with third turn 56c and destination 54 highlighted so that the user can gauge a distance therebetween. Interactive 3D navigation system 10 may then await further user input 124.

In exemplary usages, a user may iterate through previews of all turns of route 56 in sequence as to preview the entire route 56. This may be useful, for example, before the user embarks on route 56. In other usages, a user may jump to specific turns. For example, if a user learns in advance that one of turns 56*a-c* is confusing, complex, or difficult to navigate, the user may wish to preview that turn in particular. Alternatively, if a user is proceeding along route 56, the user may wish to preview the specific turn 56*a-c* that is next on route 56. In still other exemplary usages, interactive 3D navigation system 10 may include a GPS or other location-tracking module (not shown), determine which of the turns 56*a-c* is upcoming for the user, and queue a 3D animated preview for that turn. At an appropriate time, such as when the vehicle is stopped or when the user indicates through user control system 18 that the user wishes to see the 3D animated preview for the next turn, interactive 3D navigation system 10 may show the queued 3D animated preview.

Though 3D animated previews may not be shown while the vehicle is moving, interactive 3D navigation system 10 may still be configured to automatically issue route guidance instructions of some form when maneuvers are impending, to ensure that the user does not miss required maneuvers.

Interactive 3D navigation system 10, including route selector 12, turn selector 14, location selector 15, vantage controller 16, timing controller 17, instructional overlay integrator 19, vehicle speed detector 34, and user control system 18, may be implemented in software, compiled and stored to a memory as object code, and during operation of the vehicle, may be invoked for execution by a processor. In one implementation, the above-described components are implemented as a single system on a chip. The interconnections among the above-described components can be provided through any suitable electronic communication mechanism, such as a communication bus. Whether implemented as one chip module or multiple chip modules, interactive 3D navigation system 10 may be provided in any convenient location in the vehicle, such as behind a dashboard near other electronic circuitry. Such a location may be beneficial for providing convenient access to a power source, and to the electronic systems controlling the vehicle's driving.

Display 32 may be any display suitable for use in displaying information or entertainment features to a user, and may be part of an "infotainment" unit. Display 32 may include a touch screen interface through which a user can interact with graphical icons rendered on display 32 using gestures. 3D image service 30 and navigation server 36 may be implemented in any suitable server environment, and may include a processor, memory, and computer-readable code stored on the memory for execution on the processor. 3D image database 30*b* may be implemented using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A vehicle navigation system for previewing turns for a user, the system comprising:
a processor and a non-transitory data storage on which is stored computer code which, when executed on the processor, causes the vehicle navigation system to:
obtain a route between an origin and a destination, wherein the route includes a plurality of turns and instructions for the user at each of the plurality of turns; and
select one of the turns to preview for the user; and
means for selecting locations, vantages, and timing for a three-dimensional animated preview of a locale of the selected turn and for retrieving the three-dimensional animated preview, wherein the three-dimensional animated preview simulates how the locale will appear while the instructions for the selected turn are followed; and
a display for displaying the three-dimensional animated preview to the user,
wherein the means for selecting vantages are configured to select vantages that avoid viewing obstructions for a user to view the simulated three-dimensional animated turn preview.

2. The vehicle navigation system of claim 1, further comprising user controls that enable the user to adjust the vantages.

3. The vehicle navigation system of claim 1, further comprising steering wheel controls that enable a user to view previews for each of the turns in sequence.

4. A method for providing navigation instructions by previewing turns for a user, the method comprising:
obtaining a route between an origin and a destination, wherein the route includes a plurality of turns and instructions for the user at each of the plurality of turns;
selecting one of the turns to preview for the user;
selecting a vantage for a three-dimensional animated preview of a locale of the turn, wherein the three-dimensional animated preview simulates how the locale will appear while the instructions for the selected turn are followed;
accessing the three-dimensional animated preview; and
displaying the three-dimensional animated preview,
wherein the vantages for locations along the turn are selected that avoid obstructions for a user to view the simulated three-dimensional animated turn preview.

5. The method of claim 4, wherein the three-dimensional animated preview comprises an animation simulating the selected turn.

6. The method of claim 1, wherein the vantages comprise respective latitudes, longitudes, elevations, angular orientations, and fields of view of the selected locations.

7. The method of claim 6, further comprising enabling the user to adjust the vantages through steering wheel buttons.

8. The method of claim 4, further comprising determining whether a vehicle being operated by the user is stopped; and
displaying the three-dimensional animated preview to the user only in response to a determination that the vehicle is stopped.

9. The method of claim 7, further comprising sequentially previewing each of the plurality of turns on the route in order.

10. The method of claim 4, further comprising selecting one of the turns to preview for the user in response to receiving a user command specifying a requested turn.

11. The method of claim 10, further comprising receiving the user command through steering wheel buttons.

12. The method of claim 10, further comprising receiving the user command through a voice command.

13. A navigation system, comprising:
a processor and a non-transitory data storage on which is stored computer code which, when executed on the processor, causes the navigation system to:

obtaining a route between an origin and a destination, wherein the route includes a plurality of turns and instructions for a user at each of the plurality of turns;

select one of the turns to preview for the user;

select a vantage for a three-dimensional animated preview of a locale of the turn, wherein the three-dimensional animated preview simulates how the locale will appear while the instructions for the selected turn are followed;

access the three-dimensional animated preview; and a display for displaying three-dimensional animated preview to the user, wherein vantages for locations along the turn are selected that avoid obstructions for a user to view the simulated three-dimensional animated turn preview.

14. The system of claim 13, further comprising user controls that enable a user to adjust the vantage through steering wheel buttons.

15. The system of claim 13, wherein the computer code, when executed on the processor, causes the navigation system to:

determine whether a vehicle being operated by the user is stopped; and display the sequence of the selected frames to the user only in response to a determination that the vehicle is stopped.

16. The system of claim 13, wherein the computer code, when executed on the processor, causes the navigation system to sequentially preview each of the plurality of turns on the route in order.

17. The system of claim 13, further comprising user controls that enable a user to specify a turn for which a preview is requested.

18. The system of claim 17, wherein the user controls are disposed on a steering wheel.

19. The system of claim 13, further comprising a voice recognition module for receiving the user commands.

20. The system of claim 1, wherein the simulated three-dimensional animated turn preview includes photographic image data of the locale of the selected turn.

21. The method of claim 4, wherein the simulated three-dimensional animated turn preview includes photographic image data of the locale of the selected turn.

22. The system of claim 13, wherein the simulated three-dimensional animated turn preview includes photographic image data of the locale of the selected turn.

\* \* \* \* \*